United States Patent [19]
Joulie et al.

[11] Patent Number: 6,002,571
[45] Date of Patent: Dec. 14, 1999

[54] LIGHTNING ARRESTER ASSEMBLY FOR AN OVERHEAD ELECTRICITY LINE WITH A DEVICE FOR FLAGGING AN ARRESTER MALFUNCTION

[75] Inventors: Rene Joulie, Bellerive sur Allier; Serge Tartier, Cusset; Emmanuel Brocard, Acheres, all of France

[73] Assignee: Sediver, Societe Europeenne d'Isolateurs en Verre et Composite, Nanterre, France

[21] Appl. No.: 09/176,583

[22] Filed: Oct. 21, 1998

[30] Foreign Application Priority Data

Oct. 24, 1997 [FR] France .................................. 97 13355

[51] Int. Cl.⁶ ...................................................... H02H 1/00
[52] U.S. Cl. .......................... 361/117; 361/131; 361/137
[58] Field of Search .................................... 361/117, 131, 361/132, 136, 137

[56] References Cited

U.S. PATENT DOCUMENTS 5,663,863  9/1997  Ohashi et al. ........................... 361/118

FOREIGN PATENT DOCUMENTS 0431528  6/1991  European Pat. Off. .

OTHER PUBLICATIONS

Patent Abstracts of Japan, vol. 97, No. 1, Jan. 31, 1997 & JP 08 251784 NGK Insulators LTd. Sep. 27, 1996.
Patent Abstracts of Japan, vol. 13, No. 88, Feb. 1989 & JP 63 266791A (Hitachi Ltd.) Nov. 2, 1988.
Patent Abstracts of Japan, vol. 95, No. 10, Nov. 30, 1995 & JP 07 176235 (Toshiba Corp) Jul. 14, 1995.

*Primary Examiner*—Michael J. Sherry
*Attorney, Agent, or Firm*—Ware, Fressola, Van Der Sluys & Adolphson LLP

[57] ABSTRACT

The lightning arrester assembly for an overhead line for transporting electricity comprises a lightning arrester connected in series with a horned spark-gap between the electricity transport line and a support structure in the form of an arm of a pylon connected to ground. The assembly also includes a device for flagging a malfunction of the lightning arrester, which device is connected in series with the lightning arrester on one of the horns of the spark-gap.

4 Claims, 1 Drawing Sheet

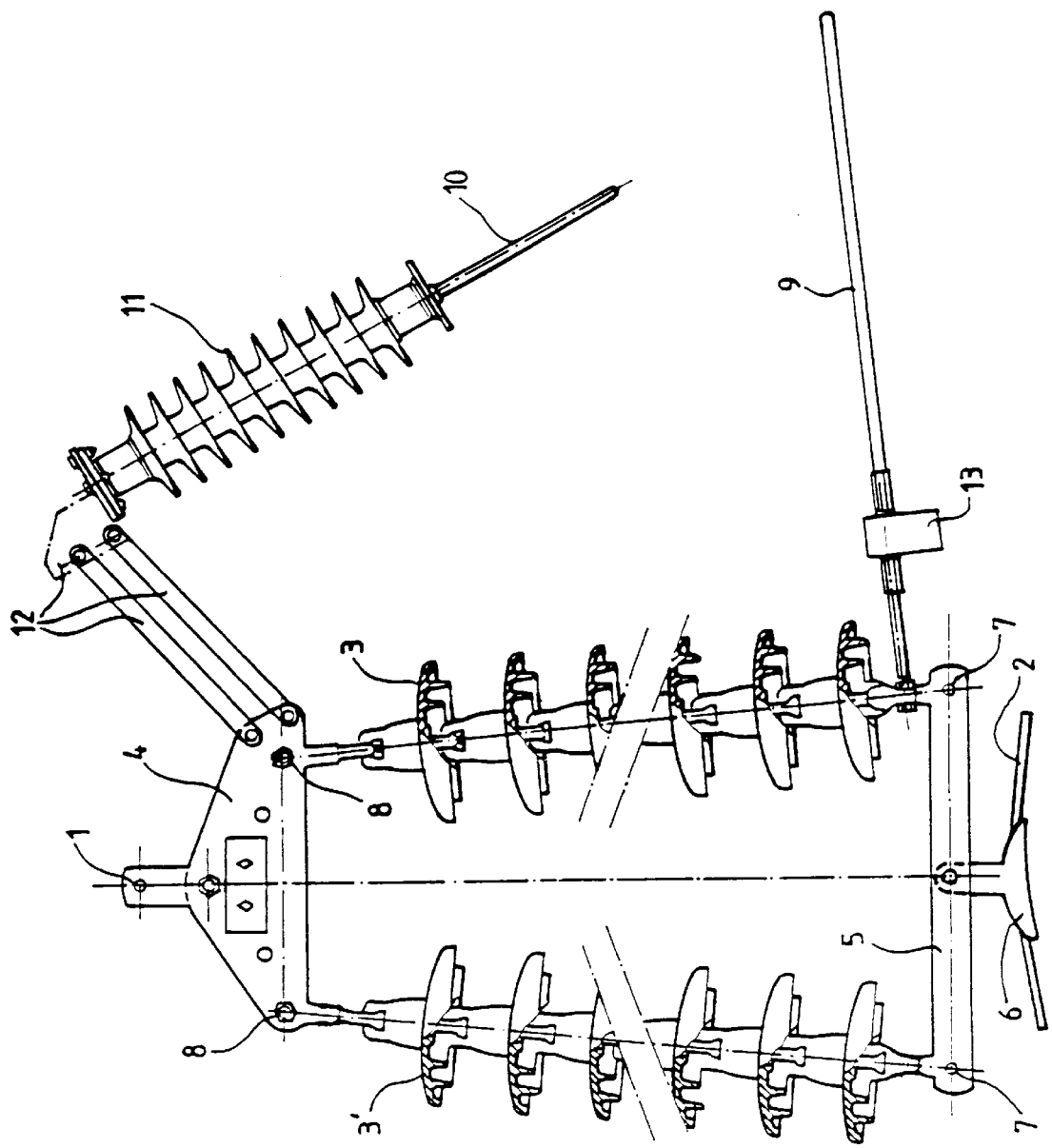

LIGHTNING ARRESTER ASSEMBLY FOR AN OVERHEAD ELECTRICITY LINE WITH A DEVICE FOR FLAGGING AN ARRESTER MALFUNCTION

TECHNICAL FIELD

The invention relates to a lightning arrester assembly for an overhead line for transporting electricity at high voltage. The invention relates more particularly to assemblies in which each wire of a line is suspended from a high up pylon by means of an electrical insulator or a string of insulator elements, together with a horned spark-gap having a first horn electrically connected to the wire of the line and a second horn connected directly to ground or to a lightning arrester itself connected to ground.

BACKGROUND OF THE INVENTION

In operation, an overhead line for transporting electricity is continuously subjected to polyphase alternating high voltage on which transient surge voltages may be superposed, as can happen particularly during the operations of opening or closing the line, and as can also happen, exceptionally but with much greater magnitude, in the event of a lightning strike. It is therefore the practice to associate spark-gaps with an overhead line to limit the effects of such voltage surges, and more recently to associate lightning arresters therewith to provide additional protection.

Such spark-gaps and arresters are commonly associated with the line wire support assemblies of the pylons that support an overhead line for transporting electricity.

Document EP-A-0 431 528 includes a FIG. 1 showing a conventional line wire support assembly in which an insulator element made up of a string of insulators is suspended via one end from the underside of a pylon arm via a mechanical suspension structure, with said end being connected to ground. The wire is secured to a load-carrying mechanical structure which is fixed beneath the other end of the insulator element. The assembly also includes a circuit branch having a horned spark-gap connected in series with a lightning arrester between a line wire and ground.

The spark-gap has two horns, one fixed to a first end of the insulator element which is connected to the line wire, and the other fixed to the lightning arrester via which it is connected to ground and to a second end of the insulator element.

The distance between the free ends of the horns of that spark-gap is selected to ensure that an arc is always struck between said ends and thus via the lightning arrester whenever a dangerous voltage surge appears, and in particular in the event of lightning.

In the event of a lightning strike, and during a short time interval, the current which appears when an electric arc is struck between the horns of the spark-gap can be very large, for example of the order of 5,000 amps to 200,000 amps. There is therefore a major risk of the lightning arrester that is connected in series with the spark-gap being destroyed, if the lightning energy is greater than the energy capacity of the arrester, and under such circumstances there is thus a risk of the arc being maintained after the voltage surge has disappeared and until a line-protection circuit breaker comes into action.

It is therefore known to associate a device for flagging a malfunction or a failure to operate in order to indicate that a lightning arrester has failed, with such devices being described in particular in above-mentioned document EP-A-0 431 528. In a conventional assembly as shown in FIG. 2 of that document, the malfunction flag is provided between ground and the lightning arrester with which it is associated so as to carry the current which passes through the lightning arrester in the event of a voltage surge giving rise to an arc between the horns of the spark-gap in series with the arrester.

That arrester must therefore be connected to ground solely via the malfunction flag, and it is held in position in the assembly by means of a support block of insulating material fixed to the end of the insulator element which is connected to ground. Such an assembly presents significant drawbacks insofar as it implies that the lightning arrester is insulated from the grounded metal structure of the pylon. The insulating material support on which the arrester is mounted gives rise to additional risks of mechanical failure and, if the support is to be found in an environment that is hostile, it can sometimes lose its mechanical and electrical characteristics more quickly than expected.

In addition, the malfunction flag which must be visible to an observer, generally on the ground, can itself be hidden by other elements of the assembly because of its position at the top of the insulator element close to the top end of said element.

OBJECT AND SUMMARY OF THE INVENTION

The object of the invention is to remedy the various drawbacks of the prior art.

To this end, the invention provides a lightning arrester assembly for an overhead line for transporting electricity, in which a lightning arrester is connected in series with a horned spark-gap between the electricity transport line and a support structure in the form of a pylon arm connected to ground, and including a device for flagging a malfunction of the lightning arrester, wherein said device for flagging a malfunction of the lightning arrester is connected in series with the lightning arrester on one of the horns of the spark-gap.

In a particular embodiment of the invention, the spark-gap has a first horn electrically connected to the electricity transport line and a second horn electrically connected to one end of the lightning arrester, the device for flagging a malfunction being connected to the first horn of the spark-gap, e.g. in series between two segments of the first horn. The flag device is preferably placed as close as possible to the end of the first horn connected to the electricity transport line.

BRIEF DESCRIPTION OF THE DRAWING

The invention, its characteristics, and its advantages, are described in greater detail below with reference to the sole FIGURE as defined below.

The sole FIGURE is a diagram summarizing a particular assembly of the invention having a flag for flagging a malfunction of a lightning arrester on a pylon that supports an overhead electricity line.

BEST MODE FOR CARRYING OUT THE INVENTION

This assembly having a malfunction flag for a pylon supporting an overhead line for transporting electricity is designed to be suspended from an end 1 of a support arm of a pylon (not shown), via a supporting insulator element.

By way of example, the insulator element may be made up of a single insulator module or of one or more strings of insulators. In the example shown of an assembly of known type, a pylon supports a line wire 2 via an insulator element made up of two identical parallel strings 3 and 3' of insulators in series disposed in a mechanical structure having the shape of an isosceles trapezium with one of its parallel sides being constituted by a hanger structure 4 which is attached beneath the end 1, and with its other parallel side being constituted by a carrier structure 5 having the wire 2 centrally secured thereto by means of a cradle 6.

The wire 2, the carrier structure 5, and the cradle 6 are electrically insulated from the hanger structure 4 and from the pylon including the end 1 by means of the strings of insulators 3 and 3'. These strings have respective first ends 7 raised to the same potential as the wire 2, when the line including said wire is in operation, and respective second ends 8 connected to ground, as is the pylon.

In the assembly shown in FIG. 1, a horned spark-gap comprising a first horn 9 and a second horn 10 is connected in series with a lightning arrester 11. The circuit branch constituted by these parts is positioned between the first end of the insulator string 3 to which the first horn 9 is electrically connected and the second end 8 of said string to which the second horn 10 is connected, in this case via the lightning arrester 11 and an electrically-conductive mechanical structure 12 for supporting the lightning arrester. The arm-shaped support structure 12 positions the lightning arrester 11 on the hanger structure 4 to which it electrically connects the end of said lightning arrester that is remote from its end which is connected to the horn 10.

In a variant embodiment (not shown), and as already mentioned above, a line wire may optionally be supported by an insulator element that has only one string of insulators, or indeed only one insulator.

In all embodiments of the invention, a flag 13 for flagging a malfunction of the lightning arrester is placed on one of the horns of the spark-gap that is connected in series with the lightning arrester 11 for the purpose of monitoring the arrester. The malfunction flag 13 is actuated by the current which passes through the lightning arrester to ground in the event of an electric arc being struck between the horns 9 and 10.

In the embodiment shown, the flag 13 is placed on the first horn 9 of the spark-gap connected in series with the associated lightning arrester 11, thereby enabling it to be protected against electric arcing in the event of the lightning arrester being broken.

In a first variant of this embodiment, the malfunction flag 13 is connected in series between a first segment of the first horn 9 which is electrically connected to the wire 2 and to the first end 7 of the insulator element in the vicinity of which said first segment is mechanically secured, and a second segment terminating said first horn.

By way of example, the malfunction flag 13 has a body with two conductive tubular endpieces aligned on either side thereof to co-operate electrically and mechanically with respective rod-type segments of the first horn 9 of the spark-gap on which it is assembled. Electromechanical connection between an endpiece of the malfunction flag 13 and a segment of the first horn 9 can be made, for example, by means of a conductive tube which is engaged on the endpiece and on the segment so that they are thus placed end to end, and the tube is then swaged onto each of them. Naturally, it is also possible to provide such an assembly in a variant on the second horn of the spark-gap that is in series with the lightning arrester being monitored.

In another variant embodiment, the malfunction flag 13 is mounted on the horn on which it is itself fixed, thus enabling the horn to be made as a single piece. The body of the malfunction flag 13 is then either provided with a through orifice enabling the horn to pass therethrough, as is the case for toroidal type malfunction flags, or else it is made as two parts that are separable and suitable for surrounding the horn.

In a preferred embodiment of the invention, the malfunction flag 13 associated with a lightning arrester is positioned at a distance from the free, or "sparking" end terminating the horn on which it is placed, and preferably as close as possible to the other end of the horn.

The malfunction flags included in an assembly of the invention can be of any known type enabling at least minimal indication to be given of failure of the respective lightning arresters with which they are individually associated. FIG. 6 of above-mentioned document EP-A-0 431 528 shows a conventional embodiment of a relatively simple malfunction flag.

Such flags may also be of a type that makes it possible to provide a greater amount of information, e.g. making it possible to specify the number of lightning strikes, as is known to the person skilled in the art.

We claim:

1. A lightning arrester assembly for an overhead line for transporting electricity, in which a lightning arrester is connected in series with a horned spark-gap between the electricity transport line and a support structure in the form of a pylon arm connected to ground, and including a device for flagging a malfunction of the lightning arrester, wherein said device for flagging a malfunction of the lightning arrester is connected in series with the lightning arrester on one of the horns of the spark-gap.

2. The assembly according to claim 1, in which the spark-gap has a first horn electrically connected to the electricity transport line and a second horn electrically connected to one end of the lightning arrester, the device for flagging a malfunction being connected to the first horn of the spark-gap.

3. The assembly according to claim 2, in which the device for flagging a malfunction is placed in series between two segments of the first horn of the spark-gap.

4. The assembly according to claim 2, in which the device for flagging a malfunction is placed as close as possible to the end of the first horn connected to the electricity transport line.

* * * * *